(12) United States Patent
Johnson et al.

(10) Patent No.: US 9,098,696 B2
(45) Date of Patent: Aug. 4, 2015

(54) APPLIQUÉ PROVIDING A SECURE DEPLOYMENT ENVIRONMENT (SDE) FOR A WIRELESS COMMUNICATIONS DEVICE

(71) Applicant: Raytheon Company, Waltham, MA (US)

(72) Inventors: Noel E. Johnson, Fort Wayne, IN (US); Anne-Marie Buibish, Churubusco, IN (US)

(73) Assignee: Raytheon Company, Waltham, MA (US)

( * ) Notice: Subject to any disclaimer, the term of this patent is extended or adjusted under 35 U.S.C. 154(b) by 73 days.

(21) Appl. No.: 13/660,715

(22) Filed: Oct. 25, 2012

(65) Prior Publication Data

US 2013/0104232 A1    Apr. 25, 2013

Related U.S. Application Data (60) Provisional application No. 61/551,095, filed on Oct. 25, 2011.

(51) Int. Cl.
| | |
|---|---|
| *H04L 29/06* | (2006.01) |
| *G06F 21/53* | (2013.01) |
| *H04W 12/12* | (2009.01) |

(52) U.S. Cl.
CPC ............. *G06F 21/53* (2013.01); *H04W 12/12* (2013.01); *G06F 2221/2115* (2013.01)

(58) Field of Classification Search
CPC . G06F 21/53; G06F 2221/2115; H04W 12/12
USPC ............ 726/23; 713/322; 380/29–30; 714/37
See application file for complete search history.

(56) References Cited

U.S. PATENT DOCUMENTS 5,297,201 A * 3/1994 Dunlavy ................. 380/252
5,423,045 A * 6/1995 Kannan et al. .......... 713/322

(Continued)

FOREIGN PATENT DOCUMENTS

WO    WO-2013/063285 A1    5/2013

OTHER PUBLICATIONS

International Application Serial No. PCT/US2012/061951, International Preliminary Report on Patentability mailed May 8, 2014, 8 pgs.

(Continued)

*Primary Examiner* — Harunur Rashid
*Assistant Examiner* — Angela Holmes
(74) *Attorney, Agent, or Firm* — Schwegman Lundberg & Woessner P.A.

(57) ABSTRACT

A security appliqué provides a secure deployment environment (SDE) for a wireless communications device. The Security appliqué isolates the security features, requirements, and information security boundaries such that no hardware modifications are required to a wireless communications device. Rather, a security module thin client is provided to the wireless communications device to provide the Secure Deployment Environment (SDE). The wireless communications device is coupled to the security appliqué via the standard connection interface. Through the standard connection interface, the security appliqué provides the SDE for the wireless communications device without implementing modifications to the wireless communications device.

8 Claims, 6 Drawing Sheets

(56) References Cited

U.S. PATENT DOCUMENTS

| | | | |
|---|---|---|---|
| 5,724,425 A * | 3/1998 | Chang et al. | 705/52 |
| 2003/0177397 A1 | 9/2003 | Samman | |
| 2004/0252838 A1 | 12/2004 | Ma | |
| 2007/0050766 A1 * | 3/2007 | Pomerantz | 718/1 |
| 2007/0199060 A1 | 8/2007 | Touboul | |
| 2008/0082837 A1 * | 4/2008 | Mattsson | 713/193 |
| 2009/0132281 A1 | 5/2009 | Lyshkow | |
| 2009/0204964 A1 * | 8/2009 | Foley et al. | 718/1 |
| 2009/0319782 A1 * | 12/2009 | Lee | 713/156 |
| 2009/0328182 A1 * | 12/2009 | Malakapalli et al. | 726/11 |
| 2010/0058087 A1 | 3/2010 | Borras et al. | |
| 2010/0241607 A1 | 9/2010 | Fujioka | |
| 2011/0022835 A1 | 1/2011 | Schibuk | |
| 2011/0060947 A1 * | 3/2011 | Song et al. | 714/37 |

OTHER PUBLICATIONS

International Application Serial No. PCT/US2012/061951, International Search Report mailed Jan. 9, 2013, 2 pgs.
International Application Serial No. PCT/US2012/061951, Written Opinion mailed Jan. 9, 2013, 6 pgs.

* cited by examiner

APPLIQUÉ PROVIDING A SECURE DEPLOYMENT ENVIRONMENT (SDE) FOR A WIRELESS COMMUNICATIONS DEVICE

CLAIM OF PRIORITY

This application claims priority under 35 U.S.C. 119(e) to U.S. Provisional Patent Application Ser. No. 61/551,095, filed Oct. 25, 2011, which is incorporated herein by reference in its entirety.

BACKGROUND

Wireless communications devices, such as wireless smartphones, are used worldwide by millions of people. For example, smartphones may employee features of both a computer and a mobile phone. Wireless communications devices allow users to execute many different types of applications on the same platform. In addition, wireless devices store user information, such as contact lists, and generate task lists, schedule appointments and set reminders. Text and email communication has become ubiquitous. Further, users access information, such as news, sports, entertainment, stock data, weather reports, movie times and locations and a wide array of other information. Wireless communications devices also provide GPS applications for navigation, identifying locations of friends, identifying the location of businesses, etc. Still further, business critical applications have been developed to allow employees to perform their jobs better and more efficiently. For example, much of the work usually performed using a notebook or desktop computer may now be performed anywhere using a wireless communications device. Accessories have also been developed, such as credit card readers and QR codes, have revolutionized the way goods and services are bought and sold. Wireless communications devices are also enabling businesses to target customers using through text message advertising, smartphone applications, social networks. Thus, wireless communications devices have turned into powerful tools that allow easy access to a host of critical corporate information.

With the transmission and reception of such a plethora of data, the security of such data has come into question. Previous attempts to address these security issues by the government, as well as industry, have focused on securing the smart device itself, modifying the OS, modifying the handset, using special applications, only enabling limited user features, and providing only limited capabilities, which have all been plagued by Certification and Accreditation (C&A) delays and excessive maintenance costs. Each attempt has failed to do so in an economic and/or efficient manner. For example, methods that use primary and secondary wireless devices have been proposed to secure transmission of signals in wireless communications devices. However, such a multi-tiered approach increases complexity and cost associated with such information. Additional efforts have been proposed to secure electronic health records, which may be shared using wireless communications devices. In this area, much of the focus has been on encryption and authentication, which is easily overcome by inside workers.

Accordingly, documents are traveling farther and wider than ever before due to expanding corporate ecosystems and increasingly virtualized business networks encompassing more partners, joint ventures, and collaborative projects. While transactions, such as merger and acquisition and technology licensing, have long wrestled with the problem of securing documents traveling outside the company, now a host of business and collaborative processes face the same problems. Nevertheless, many of today's endpoints are neither known nor protected. Even as wireless communications devices are being used to access personal applications on the web, they are also accessing corporate resources such as e-mail and business databases—all from the very same unmanaged devices, which have not been vetted by the security organization.

Some of the key commercial issues to address in securing smart devices is frequency of device hardware, software and firmware releases, short time to live in the market place (e.g., may be 8 months or less), user downloadable applications containing malware, lack of security features provided by the developer, lack of user awareness of security threats, vulnerabilities and secure processing practices sometime referred to secure hygiene or security hygiene.

The security problems discussed above are not limited to the enterprise, of course. While the securing of smart devices including smart phones, smart tablets, iPods, iPads, and personal data devices is a challenging task for numerous reasons in the commercial market, the use of smart devices is the tactical environment is even more challenging. Secure smart devices in the tactical environment can add the following security concerns; supply chain, user down load of unapproved applications, processing of classified data on unsecure devices, data storage, user identification, authorization and access.

To raise the information assurance level of products and services more broadly, the protection of national security systems demands are teamed with public and private institutions, which the whole spectrum of information technology (IT) users. The National Security Agency (NSA) applies its information assurance (IA) resources to evaluate wireless communications device products to test and formal analyze, among other things, cryptographic security, functional security, tamper resistance, emissions security and security of the product manufacturing and distribution process. Previous attempts to secure wireless communications devices for classified processing by governments have included government development of a secure smart phone, software only solutions, trusted operating system with separation kernels, special applications, and rented privately owned government leased code division multiple access (CDMA) network access. However, each wireless communications device differs and therefore would require separate certification. Due to the time required for NSA approved secure communications certificaton, newly-released smart wireless communications devices would likely be obsolete before it could be analyzed for NSA-approval for secure communications.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A security appliqué provides a secure deployment environment (SDE) for a wireless communications device. The security appliqué isolates the security features, requirements, anti-tamper, TEMPEST (a codename referring to investigations and studies of compromising emanations (CE)), and INFOSEC boundaries such that no hardware modifications are required to a wireless communications device. Rather, a security module thin client is provided to the wireless communications device to provide secure access to the Secure Deployment Environment (SDE). The SDE utilizes the organic capabilities of the wireless communications device to provide Human Machine Interface (HMI), telecom and network transport services. The SDE HMI services communicate with the SDE hosted within the security appliqué via a standard interface, such as the USB or serial port.

Figure 1:
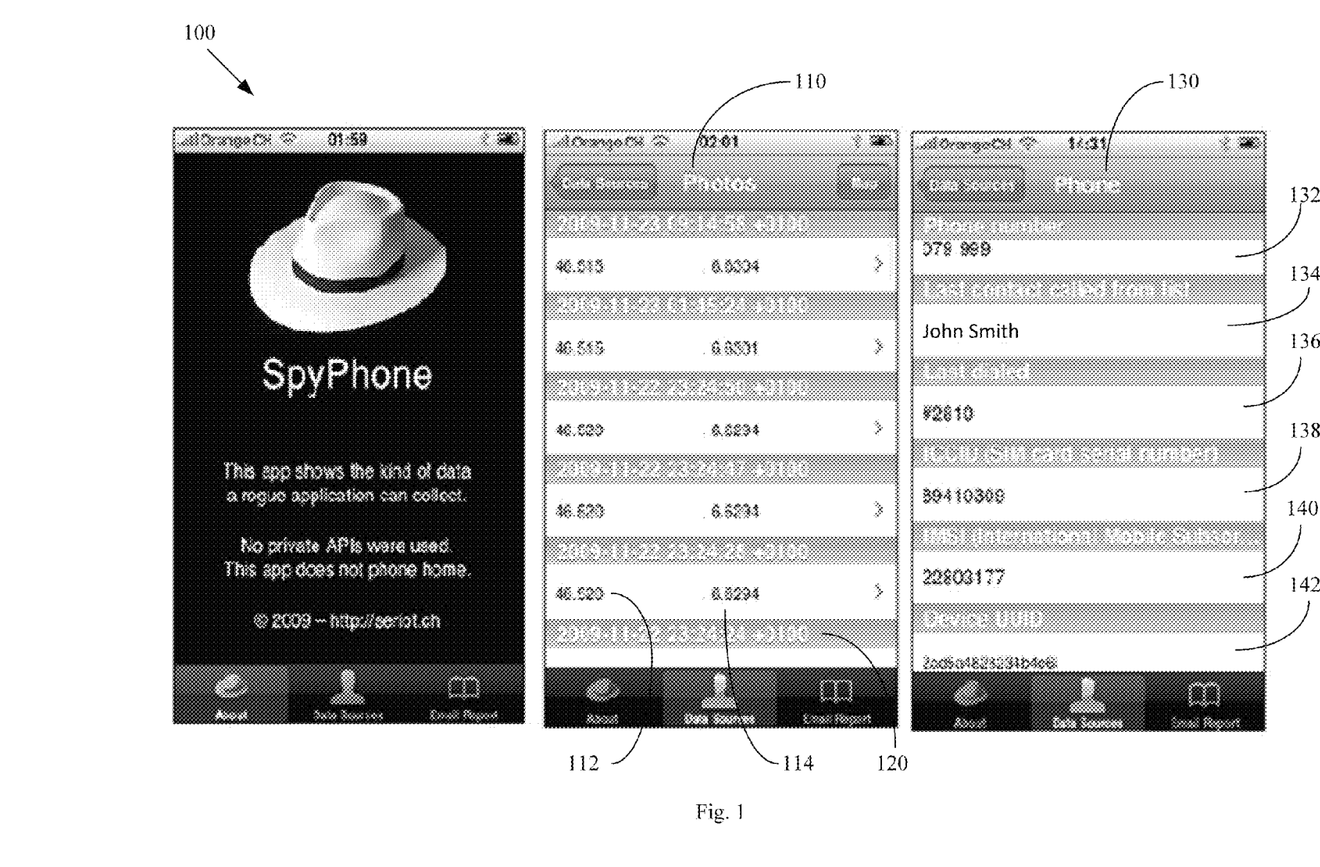
FIG. 1 illustrates an example of an application for harvesting personal data from wireless communications devices.

FIG. 1 illustrates an example of a spy application 100 for harvesting personal data from wireless communications devices. A spy application 100 may harvest geo-location data, passwords, address book entries, email account information, etc. while merely using a public API. Once the spy application 100 is downloaded to the wireless communications device, the spy application 100 has unfettered access to much of the data and settings on the device. In FIG. 1, the spy application 100 has captured photo data 110 and phone data 130. In FIG. 1, the photo data 110 is shown tagged with GPS coordinates 112, 114 and the time 120 each photo was taken. The phone data 130 shows the phone number 132, the last contact called 134, the last number dialed 136, the SIM card serial number 138, the International Mobile Subscriber Identity (IMSI) 140, which is a unique identification associated with all GSM, UMTS and LTE network SIM cards, and the device universally unique identifier (UUID) 142. Knowing the phone data listed above, may allow the clandestine interception of calls to such phone.

Figure 2:
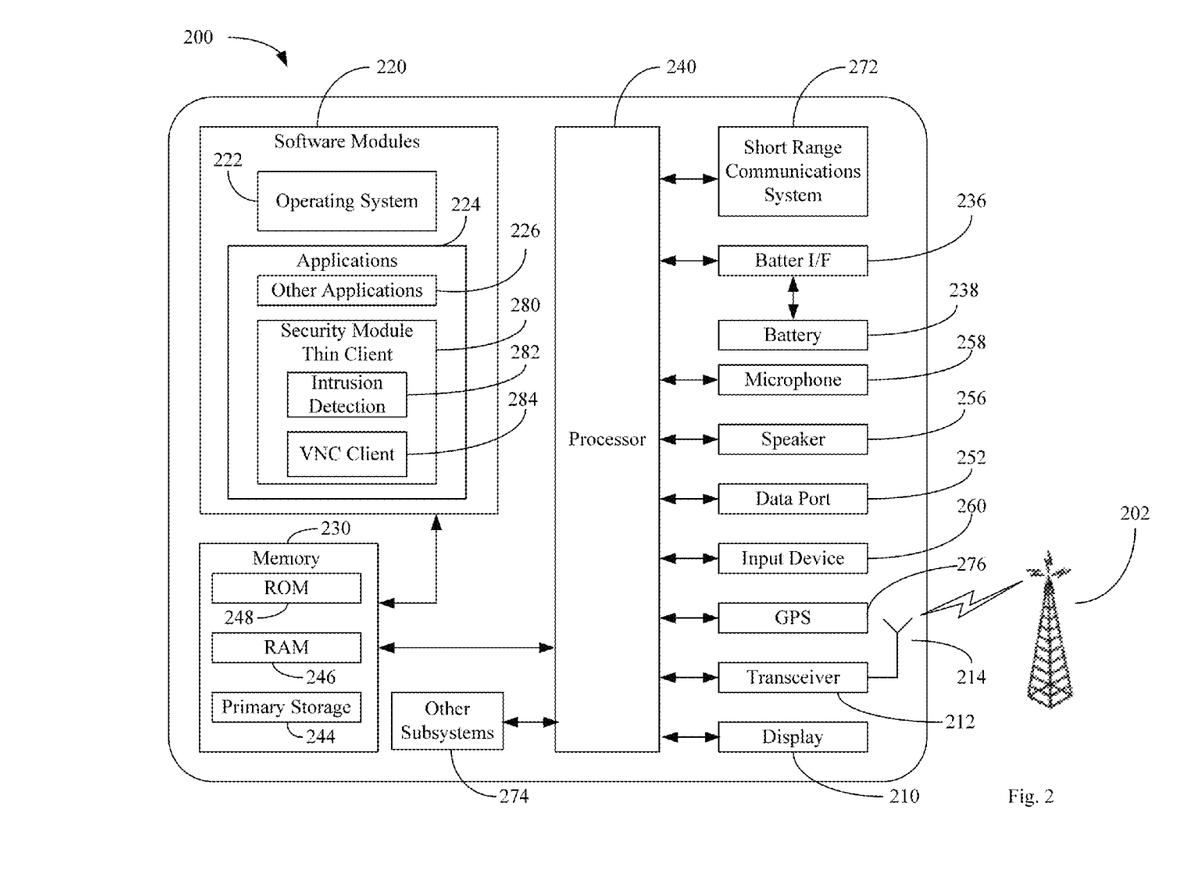
FIG. 2 shows a wireless communications device according to an embodiment.

FIG. 2 shows a wireless communications device 200 according to an embodiment. The wireless communications device 200 is a two-way communications device having voice and possibly data communication capabilities to communicate with other computer systems, e.g., via the Internet. The wireless communications device may be a multiple-mode communications device configured for data and voice communication including, but not limited to, a smartphone, a mobile telephone or a PDA (personal digital assistant) enabled for wireless communication, a computer system with a wireless modem, etc.

In FIG. 2 a processor 240 controls the overall operation of the wireless communications device 200. A transceiver 212 exchanges radio frequency signals with the wireless network 202. The processor 240 interacts with the transceiver 212 which performs communication functions. The processor 240 interacts with additional device subsystems. In some embodiments, the device 200 may include a display 210, which may include a touchscreen display, a liquid crystal display (LCD) screen, or other display type. In other embodiments, the display 210 may not be a touchscreen display. Instead, the wireless communications device 200 may simply include a non-touch display and one or more input device 260, such as, for example, a depressible scroll wheel, a keyboard, a touch pad, etc.

The processor 240 interacts with additional device subsystems including memory 230. Memory 230 may include random access memory (RAM) 246, read only memory (ROM) 248 and primary storage 244. The processor 240 also interacts with data port 252, e.g., a serial data port such as a Universal Serial Bus (USB) data port, speaker 256, microphone 258, input device 260, short-range communication subsystem 272, and other device subsystems generally designated as 274. Some of the subsystems shown in FIG. 2 perform communication-related functions, whereas other subsystems may provide "resident" or on-device functions.

The transceiver 212 may include a receiver, a transmitter, and associated components, such as the antenna 214, other antennas, local oscillators (LOs), and a processing module such as a digital signal processor (DSP). The antenna 214 may be embedded or internal to the wireless communications device 200 and a single antenna may be shared by both receiver and transmitter, as is known in the art. As will be apparent to those skilled in the field of communication, the particular design of the transceiver 212 depends on the wireless network 202 in which the wireless communications device 200 is intended to operate. As described above, the antenna 214 may be a multi-slot multiband antenna configured for wideband operation. In one example embodiment, the antenna 214 is configured to operate in at least a first frequency range, and to operate in at least a second frequency range. By "range," the present application refers to the broad set of frequency bands (both uplink and downlink) intended to be used for wireless communications conforming to a particular standard.

The wireless communications device 200 may communicate with any one of a plurality of fixed transceiver base stations of a wireless network 202 within its geographic coverage area. The wireless communications device 200 may send and receive communication signals over the wireless network 202 after a network registration or activation procedures have been completed. Signals received by the antenna 214 through the wireless network 202 are input to the transceiver 212, which may perform such common receiver functions as signal amplification, frequency down conversion, filtering, channel selection, etc., as well as analog-to-digital (A/D) conversion. /D conversion of a received signal allows more complex communication functions such as demodulation and decoding to be performed in the DSP. In a similar manner, signals to be transmitted are processed, including modulation and encoding, for example, by the DSP. These DSP-processed signals are input to the transmitter for digital-to-analog (D/A) conversion, frequency up conversion, filtering, amplification, and transmission to the wireless network 202 via the antenna 214.

The processor 240 operates under stored program control and executes software modules 220 stored in memory 230. The software modules 220 include operating system software 222 and software applications 224. One such application may be a security module thin client 280. The security module thin client 280 enables secure communications using the wireless communications device 200, while requiring no hardware changes to the wireless communications device 200 using the existing Wi-Fi and/or Cellular network. The thin client 280 controls access to data and processing on a secure smart phone appliqué (not shown in FIG. 2; see FIG. 3-5 for example. The thin client 280 provides an embedded intrusion detection software module 282 to protect the platform from malware and hostile software. The continuously functioning embedded intrusion detection system relies upon a Hardware Trust Anchor in the security appliqué to efficiently address potential undesirable intrusions into the wireless communications device. The thin client 280 also provides a a virtual network computing (VNC) client application 284 that presents a desktop view of the applications running on the security appliqué.

Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 224 may include a range of other applications 226, including, for example, a messaging application, a calendar application, and/or a notepad application. In some embodiments, the software applications 224 include an email message application, a push content viewing application, a voice communication (i.e. telephony) application, a map application, and a media player application. Each of the software applications 224 may include layout information defining the placement of particular fields and graphic elements (e.g. text fields, input fields, icons, etc.) in the user interface (i.e. the display device 210) according to the application.

In some embodiments, short range communications system 272 may support an external communication link or interface, for example, an Ethernet connection. The short range communications system 272 may include other wireless communication interfaces for communicating with other types of wireless networks, for example, a wireless network such as an orthogonal frequency division multiplexed (OFDM) network. A GPS transceiver 276 may be provided for communicating with a GPS satellite network (not shown).

The data port 252 may be used for synchronization with a user's host computer system (not shown). The data port 252 enables a user to set preferences through an external device or software application and extends the capabilities of the wireless communications device 200 by providing for information or software downloads to the wireless communications device 200 other than through the wireless network 202. The alternate download path may, for example, be used to load an encryption key onto the wireless communications device 200 through a direct, reliable and trusted connection to thereby provide secure device communication.

The wireless communications device 200 also includes a battery 238 as a power source, which is typically one or more rechargeable batteries that may be charged, for example, through charging circuitry coupled to a battery interface 236. The battery 238 provides electrical power to at least some of the electrical circuitry in the wireless communications device 200, and the battery interface 236 provides a mechanical and electrical connection for the battery 238.

The short-range communication subsystem 272 may provide for communication between the wireless communications device 200 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

Figure 3:
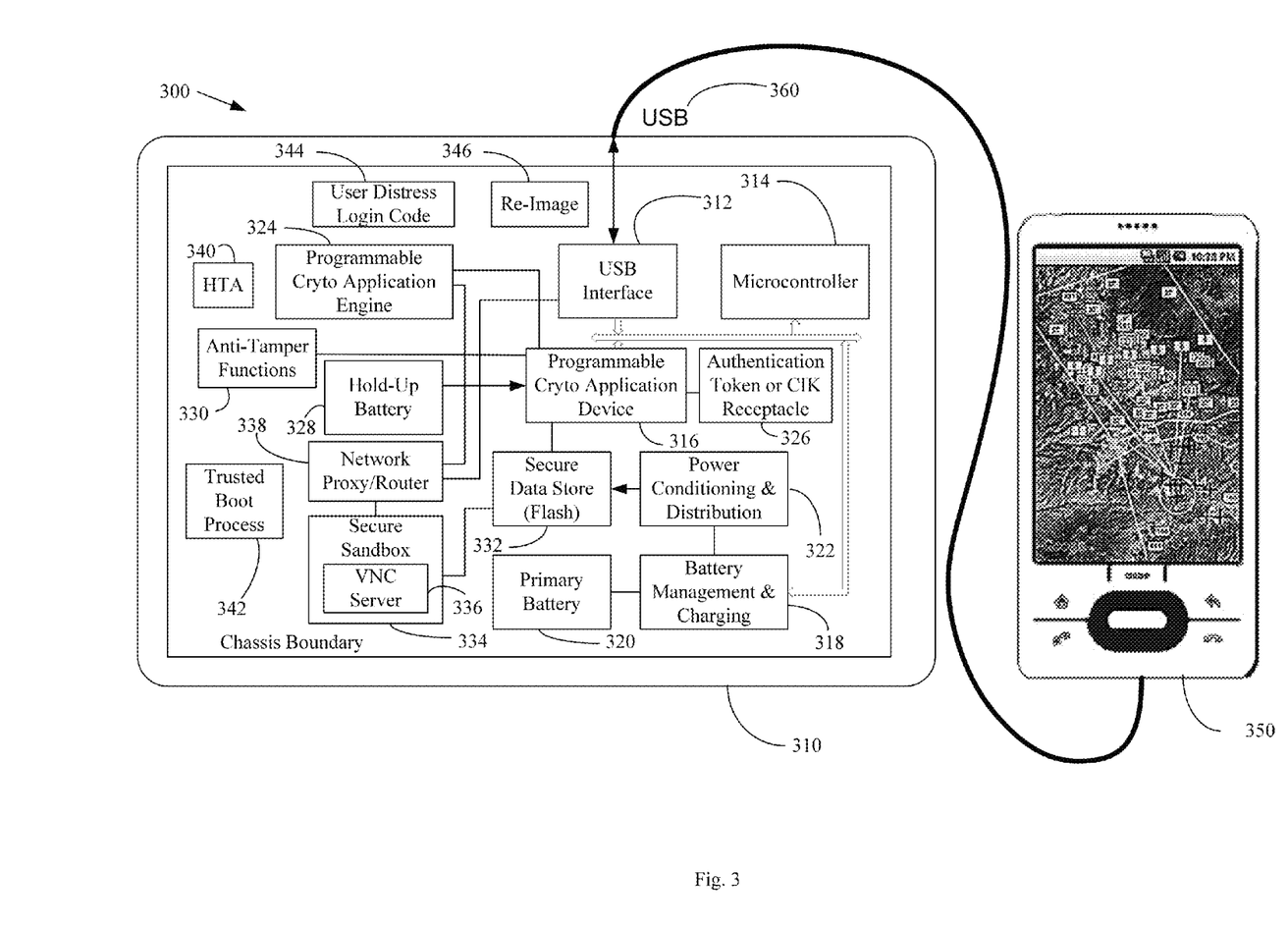
FIG. 3 illustrates a secure system according to an embodiment.

FIG. 3 illustrates a secure system 300 according to an embodiment. In FIG. 3, a security appliqué 310 is coupled to the wireless communications device 350 according to an embodiment. In FIG. 3, the security appliqué 310 is coupled to the wireless communications device 350 using, for example, standard connections such as a USB cable 360. However, the appliqué 310 may be coupled to the wireless communications device 350 using other options, such as dongles, sleeves, etc. Further, the standard connection may also be implemented with Bluetooth or Wi-Fi™ rather than USB, and the appliqué may be in the form of a "puck," wherein the security appliqué is not physically tethered to the wireless communications device 350. That is security appliqué 310 may be a dongle, sleeve, etc. In FIG. 3, the appliqué 310 includes a standard connector interface 312 for communicating with the wireless communications device 350. As shown in FIG. 3, the standard connector interface 312 is a USB interface. A processor, such as a microcontroller 314, is provided to manage the operations of the security appliqué 310.

The microcontroller 314 may determine the operating system of the wireless communications device 350. The microcontroller 314 may then boot-up to execute the same operating system on the security appliqué 310 that was determined to be running on the wireless communications device 350. The microcontroller 314 is coupled to a programmable crypto application device 316 that implements the security measures of the security appliqué 310. The microcontroller 314 may also manage analysis of battery capacity through a battery management and charging module 318. The primary batFtery 320 is coupled to the battery management and charging module 318. A power conditioning and distribution module 322 may also be provided. Anti-tamper functions module 330 interfaces with the programmable crypto application device 316 to ensure that malicious code does not attempt to alter the appliqué 300. Sensitive or confidential information may be stored in the secure data store 332 by security applications run by the security appliqué. The programmable crypto application device 316 manages the secure data store 332.

The programmable crypto application device 316 manages a programmable crypto application engine 324 which provides the core security functions. The programmable crypto application device 316 also has access to an authentication token or crypto-ignition key (CIK) receptacle 326. A relatively small sized hold-up battery 328 is provided for powering RAM and certain other types of internal components when the primary battery 320 is in a discharged state, and/or the primary battery 320 is temporarily removed so that it can be replaced. The programmable crypto application device 316 also accesses anti-tamper functions 330.

A secure sandbox 334 is provided to provide a secure environment for running the security applications. The sandbox 334 uses a virtual network computing (VNC) server 336 and a VNC Client in a thin client (not shown in FIG. 3) to allow the user to interact with the application using the wireless communications device touchscreen and keypad. The secure sandbox 334 can host a variety of operating systems, including Android and iOS. This allows the applications of the wireless communication device 350 to run in their designed OS (operating system) environment. This makes the VNC seem transparent, since for example, Android applications run on the secure appliqué 310 the same way it would run on the wireless communications device 350. The applications running on the VNC server 336 in the secure sandbox 334 are presented on the wireless mobile device 350 by sending the necessary signals to the wireless communications device 350 via a network proxy router 338 and the standard connection interface, such as the USB interface 312.

The security appliqué 310 provides many key benefits and features. For example, the security appliqué may provide secure voice and data, protection for data at rest, in process, and in transmit), low power, two factor authentication, key management and secure (encrypted) data storage. The security appliqué 310 enables transport of classified and/or secret communications over existing wireless networks, e.g., Wi-Fi, Cellular, etc.

The security appliqué 310 also includes, but is not limited to, a hardware based trust anchor 340, a trusted boot process 342, a user distress login code 344 and a re-image 346 for re-imaging the wireless communications device. Capabilities provided by the security appliqué 310 may include protection for information, separation of sensitive data processing (e.g., trade secret, confidential, secret, top secret, etc.), key management infrastructure (KMI) over the network keying (OTNK), additional external input/output capabilities, smart device honey-pot data for setting deception traps for attackers, a thin client-to-application server, and authentication. As described above, the wireless communications device is provided an intrusion detector, a message interceptor, and a remote desktop viewer. (see, FIG. 2).

Figure 4:
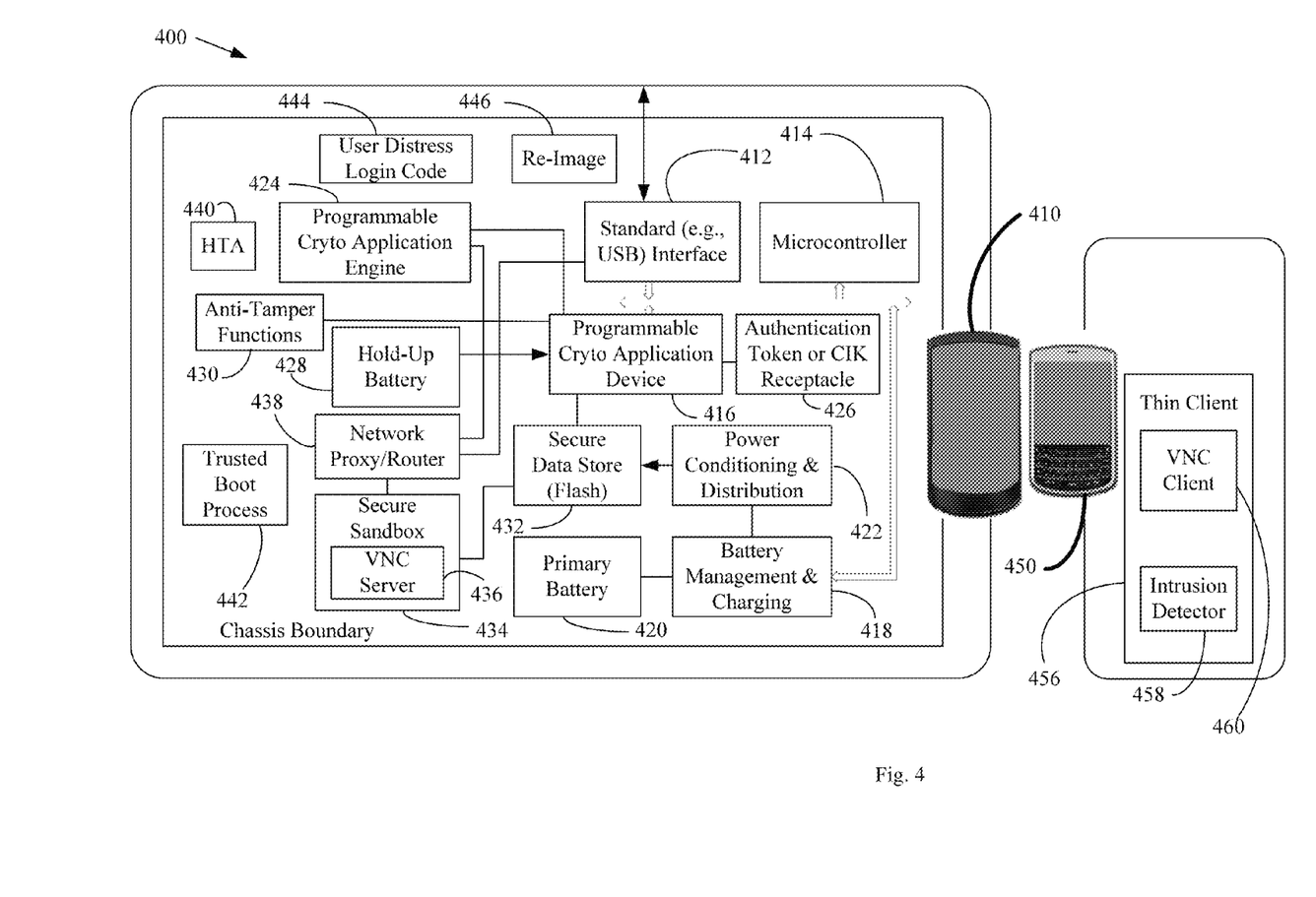
FIG. 4 shows a security appliqué configured as a sleeve for receiving a wireless communications device therein according to an embodiment.

FIG. 4 shows a secured communication system 400 having a security appliqué 410 configured as a sleeve for receiving a wireless communications device therein according to an embodiment. In FIG. 4, the security appliqué 410, as discussed above with reference to FIG. 3, includes a connector interface 412, microcontroller 414, a programmable crypto application device 416, a battery management and charging module 418, a primary battery 420, a power conditioning and distribution module 422, a programmable crypto application engine 424, an authentication token or crypto-ignition key (CIK) receptacle 426 and a hold-up battery 428, an anti-tamper functions module 430 and a secure data store 432.

The microcontroller 414 may determine the operating system of the wireless communications device 450. The microcontroller 414 may then boot-up to execute the same operating system on the security appliqué 410 that was determined to be running on the wireless communications device 450. The microcontroller 414 of the security appliqué 410 may also implements a message interceptor for processing encrypted messages.

FIG. 4 also shows the security appliqué 410 according to an embodiment. The security appliqué 410 implements cryptography, which has been selected from cryptography algorithms and protocols approved by the National Institute of Standards and Technology (NIST) for use by the U.S. Government and specified in NIST standards or recommendations.

The wireless communications device 450 loads a generic thin client 456, sometimes referred to as a chubby client, to provide the human machine interface (HMI) as a traditional user downloadable application.

A secure sandbox 434 is provided to provide a secure environment for running the security applications. The sandbox 434 uses a virtual network computing (VNC) server 436 and a VNC Client 460 in a thin client 456 running on the wireless communications device 450 to allow the user to interact with the application using a touchscreen and/or keyboard on the wireless communications device 450. The secure sandbox 434 can host a variety of operating systems, including Android and iOS. This allows the applications of the wireless communication device 450 to run in their designed OS (operating system) environment. This makes the VNC seem transparent, since for example, Android applications run on the secure appliqué 410 the same way it would run on the wireless communications device 450. The applications running on the VNC server 436 in the secure sandbox 434 are presented on the wireless mobile device 450 by sending the necessary signals to the wireless communications device 450 via a network proxy router 438 and the standard connection interface, such as the USB interface 412.

Accordingly, the security appliqué 410 isolates the security features, requirements, anti-tamper, TEMPEST, and information security (INFOSEC) boundaries such that no hardware modifications are required to the wireless communications device. Rather, the SDE HMI application communicates with the SDE for discussion purposes hosted within an appliqué via a standard connection interface, such as a USB or serial port, a Wi-Fi™ interface, a Bluetooth® interface, etc. The thin client 456 provides an embedded intrusion detection software module 458 to protect the platform from malware and hostile software.

The security appliqué 410 implements a secure deployment environment (SDE) without modifying the operating system of the wireless communications device, without using root privileges on the wireless communications device, and without loading custom applications based on the hardware, firmware or software of the wireless communications device. The security appliqué 410 provides a SDE that supports commercial wireless communication devices 450 and is handset, hardware, firmware, software and OS agnostic. The SDE provided by the security appliqué uses the commercial cellular provider for the wireless communications device 450 without modifications or special access software, protocols or procedures. The security appliqué 410 utilizes the organic capabilities of the wireless communications device 450 to provide Human Machine Interface (HMI), telecom and network transport services through the VNC server running on the security appliqué 410 and the VNC client. Together, the VNC server 434 and the VNC client 460 allow a remote desktop of the security appliqué 410 to be presented on the wireless communications device 450.

The security appliqué 410 provides all of the secure features and the security appliqué 410 has standard device interfaces so that the security appliqué 410 quickly attaches to a newly released device 450 and still allows for secure communications. The security appliqué 410 also includes, but is not limited to, a hardware based trust anchor 440, a trusted boot process 442, a user distress login code 444 and a re-image 446 for re-imaging the wireless communications device. The security appliqué 410 leverages and relies upon the Hardware Trust Anchor (HTA) 440 in the security appliqué 410 to protect the virtual environment from common threats by firmly grounding the virtual machine to a hardware device, e.g., to the programmable crypto application device or to the security appliqué 410 in general. The hardware trust anchor 440 protects an OS or virtual machine and provides a mechanism for asserting the fidelity of the underlying security appliqué 410 where the virtual machine will be deployed and informs the user of the current "trust state" of the target system thereby improving security awareness and reinforcing best practices. Accordingly, the goal of a hardware trust anchor 440 is to keep the security appliqué 410 environment "immobile" by preventing modifications. Moreover, the security appliqué 410 provides security features, capabilities and services that include anti-tamper protection, secure data at rest storage, secure data in processing (classified processing on SDE appliqué processor), secure data in transit (supports both IPsec and TLS).

Additional security capabilities and services beyond those that could be hosted on wireless communications device 450 are available via the SDE implemented by the security appliqué 410. The security posture of the security appliqué 410 and C&A is not impacted by changes in the wireless communications device 410 handset, hardware, firmware or software updates.

Thus, the security appliqué 410 allows for quick deployment of wireless communications device 450 with secure communications, e.g., secret and below, via coupling the security appliqué with the desired security features. Custom built products do not always meet the Department of Defense (DoD) requirements anymore. Their high cost and lengthy development cycle does not suit the information age where communication information and technology grow fast. To adapt to this new environment, Commercial Off The Shelf (COTS) products have become essential for military systems. COTS products are described as either software or hardware products that are commercially available for sale, for lease, or for license to the general public. COTS products are defined by the market's needs, not individual requests and may be composed of many other COTS software or hardware components. Like other products, COTS brings a lot of advantages but also carries a couple side effects for military systems. One of the most concerning for military use of a COTS product is its security. However, the security appliqué enables the secure use of COTS smart phones/tablets in a tactical environment without hardware modifications. Accordingly, the security appliqué 410 is adaptable to COTS technology refresh without the need to be recertified. The security appliqué 410 supports multiple hardware architecture and multiple operating systems. In addition, the security appliqué supports multiple C&A Paradigms such as National Institute of Standards and Technology (NIST) Federal Information Processing Standard (FIPS), National Information Assurance Partnership (NIAP)/Common Criteria (CC), National Security Agency (NSA) CSfC, and NSA Government off the Shelf (GOTS) Secret and Below (SAB).

Figure 5:
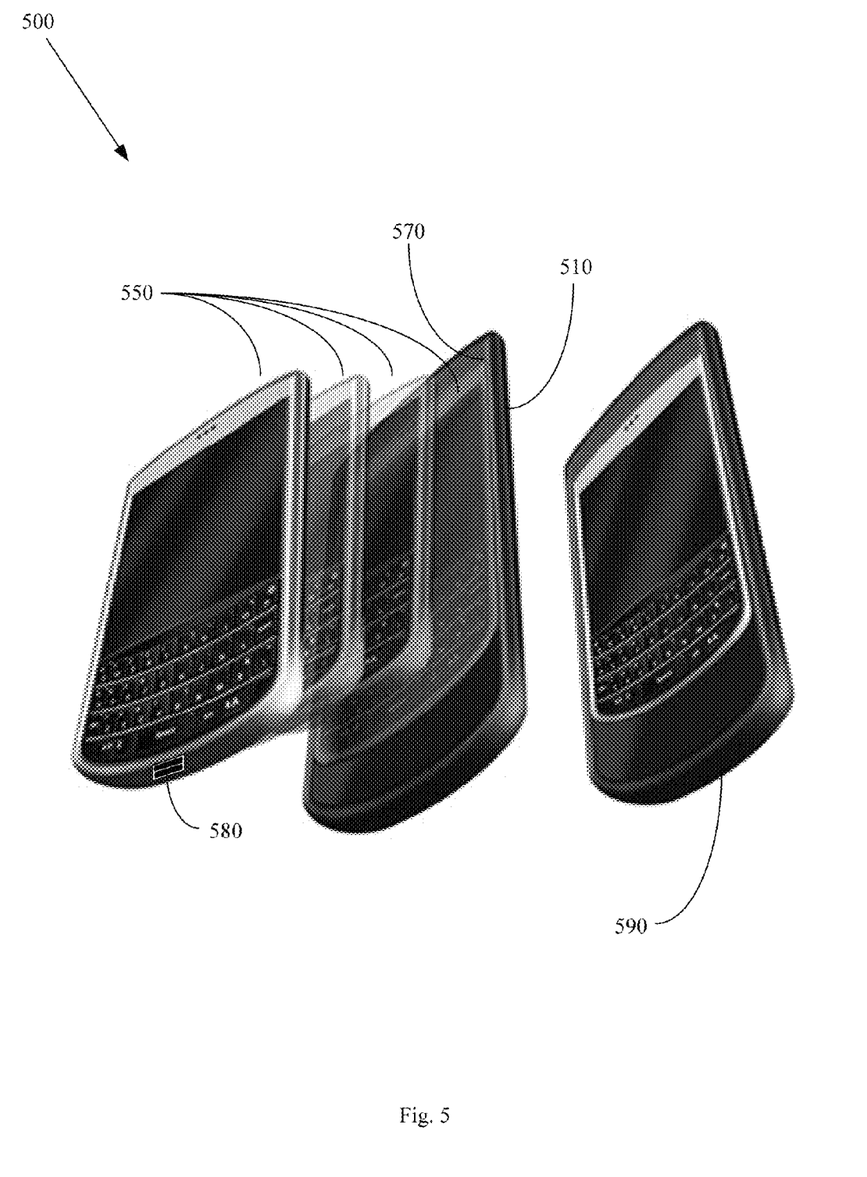
FIG. 5 illustrates a wireless communications device being inserted into a security appliqué according to an embodiment.

FIG. 5 illustrates a wireless communications device being inserted into a security appliqué 500 according to an embodiment. In FIG. 5, the wireless communications device 550 is moved toward the recess 570 in the security appliqué 510. The wireless communications device 550 is eventually positioned within the security appliqué 510. The security appliqué 510 is coupled to the wireless communications device 550 by coupling a connector interface (not shown) in the security appliqué 510 to a connector interface 580 of the wireless communications device 550. Completion of the coupling of the wireless communications device 550 to the security appliqué 510 results in a complete secure communications system 590.

Figure 6:
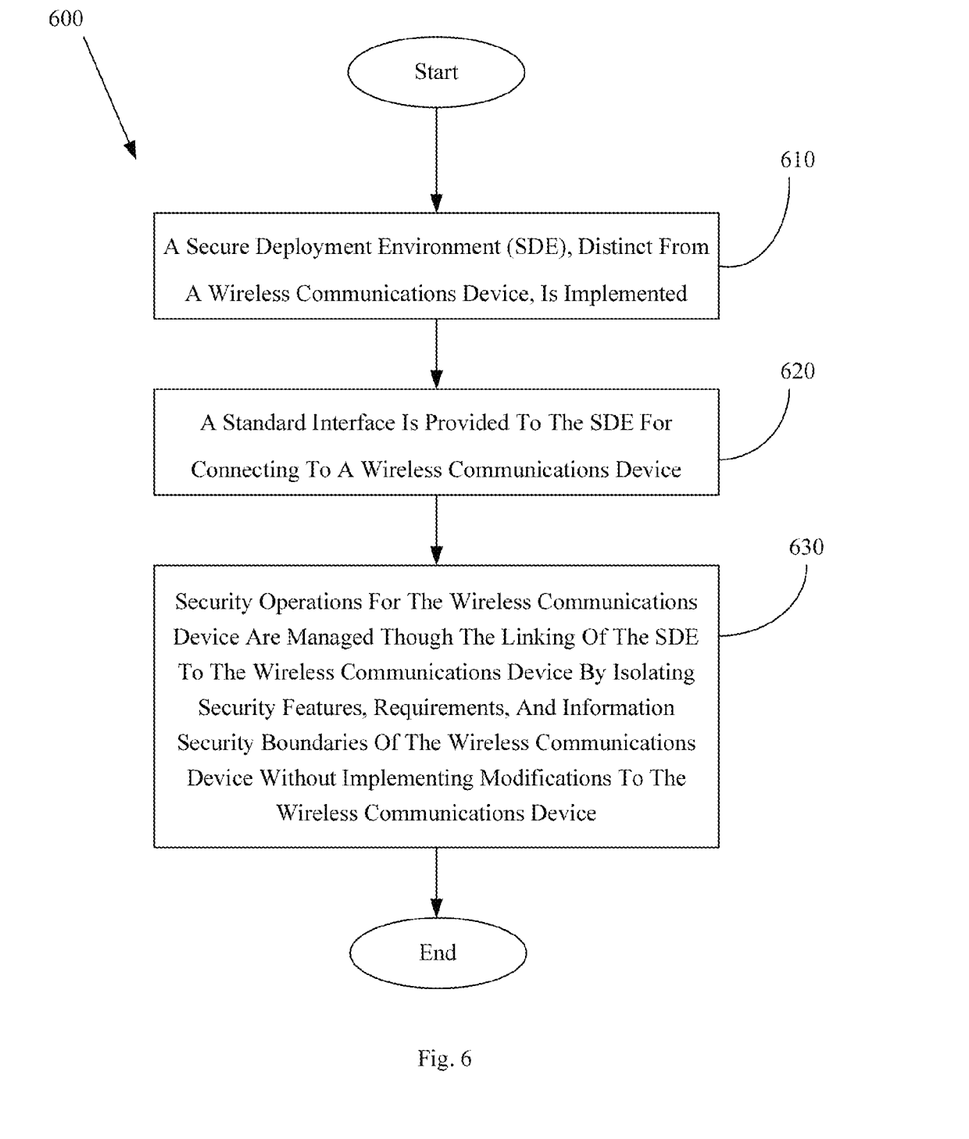
FIG. 6 is a flowchart of a method for providing a security appliqué that provides a secure deployment environment according to an embodiment.

FIG. 6 is a flowchart 600 of a method for providing a security appliqué that provides a secure deployment environment according to an embodiment. A secure deployment environment (SDE), distinct from a wireless communications device, is implemented 610. A standard interface is provided to the SDE for connecting to a wireless communications device 620. Security operations for the wireless communications device are managed by the SDE through the linking of the SDE to the wireless communications device by isolating security features, requirements, and information security boundaries of the wireless communications device without implementing modifications to the wireless communications device 630.

The above detailed description includes references to the accompanying drawings, which form a part of the detailed description. The drawings show, by way of illustration, specific embodiments that may be practiced. These embodiments are also referred to herein as "examples." Such examples can include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is part of any claim. Rather, embodiments may include less than all features of those disclosed in a particular example. Thus, the following claims are hereby incorporated into the Detailed Description, with each claim standing on its own as a separate embodiment. The scope of the embodiments disclosed herein should be determined with reference to the appended claims, along with the full scope of equivalents to which such claims are entitled.

What is claimed is:

1. A secure system, comprising:
   a wireless communications device;
   a security appliqué to provide a secure deployment environment (SDE) to manage security operations including a hardware sleeve including the communications device situated therein:
   the sleeve including:
      an interface for connecting to the communications device;
      a hardware processor, coupled to the interface, the processor to determine an operating system of the communications device, to execute the same operating system as the operating system of the communications device, and to provide a secure deployment environment (SDE) to manage security operations for the communications device without implementing modifications to the communications device;

a programmable crypto application device, coupled to the processor, to implement the security operations managed by the processor;

a secure sandbox to implement a secure environment for running an application, the secure sandbox including a virtual network computing (VNC) to present an application running on the VNC server for display on the wireless communications device and to allow a user to interact with the application using a touchscreen or keypad of the wireless communications device;

a network router, communicatively connected between the secure sandbox and the interface, the network router for providing the data from the VNC server to the interface for routing to the communications device; and a hardware trust anchor (HTA) to protect a virtual environment provided by the wireless communications device from threats by firmly grounding the virtual environment to the programmable crypto application device, wherein the HTA further provides a mechanism for asserting fidelity of the underlying platform provided by the programmable crypto application device and informs the user of the current trust-state;

the communications device coupled to the sleeve via the connection interface, the wireless communication device including a thin client application for interfacing with the security appliqué, the thin client including a VNC client and an intrusion detection module, the VNC client operable to provide access to the application through the VNC server and present a remote desktop on the communications device, the intrusion detection module to protect the thin client form malware;

wherein the security appliqué provides the SDE for the wireless communications device without implementing modifications to the wireless communications device, wherein the security appliqué communicates with the wireless communications device using the standard connection interface, wherein the security appliqué includes a processor to determine an operating system of the communications device and to execute the same operating system as the operating system of the communications device on the security appliqué.

2. The secure system of claim 1 further comprising a battery management and charging module for managing primary battery power, a power conditioning and distribution module to distribute power having a predetermined quality, an anti-tamper functions module to prevent malicious code from making alterations to code executed by the processor, and a hold-up battery to provide power to predetermined internal components when the primary battery is in a discharged state or is temporarily removed, a secure data store to store sensitive information received by the communications device and a receptacle for storing security keys.

3. The secure system of claim 1, wherein the programmable crypto application device provides secure voice and data using NIST and NSA approved algorithms.

4. The secure system of claim 1, wherein the security operations include protection for data at rest, in process, and in transit, a two factor authentication, key management, anti-tamper protection, TEMPEST protection, and secure communications over existing wireless networks.

5. The secure system of claim 1, wherein the processor provides separation of sensitive data processing from the wireless communications device, device re-imaging for the wireless communications device separating the certification of the security appliqué from the wireless communications device.

6. The secure system of claim 1, wherein the processor provides a trusted boot process and a user distress login code to the wireless communications device, wherein the security operations include using smart device honey-pot data to set deception traps for attackers.

7. The secure system of claim 1, wherein the programmable crypto application device is coupled to a programmable crypto application engine to provide core security functions implemented by the programmable crypto application device.

8. A method for providing security operations to a wireless communications device, comprising:

situating the communication device in a hardware sleeve;

implementing, using the sleeve, a secure deployment environment (SDE) on a security appliqué for the wireless communications device;

providing, by the sleeve, a standard interface to the security appliqué for communicating with the communications device;

determining, using a hardware processor of the sleeve, an operating system of the communications device and executing a same operating system as the determined operating system on the security appliqué;

managing, by the sleeve, security operations for the communications device through the linking of the SDE on the security appliqué to the communications device without implementing modifications to the communications device including:

implementing a secure sandbox on the security appliqué to provide a secure environment for running security applications for the security appliqué;

providing a virtual network computing (VNC) server running in the secure sandbox to present applications running on the VNC server for display on the communications device;

providing a network router for providing data from the VNC server to a standard communications interface for routing to the communications device for presenting the applications running on the VNC server on the communications device; and providing, by the sleeve, a hardware trust anchor (HTA) to protect a virtual environment provided by the wireless communications device from threats by firmly grounding the virtual environment to the programmable crypto application device, wherein the HTA further provides a mechanism for asserting fidelity of the underlying platform provided by the programmable crypto application device and informs the user of the current trust-state.

* * * * *

UNITED STATES PATENT AND TRADEMARK OFFICE
CERTIFICATE OF CORRECTION

| | | |
|---|---|---|
| PATENT NO. | : 9,098,696 B2 | Page 1 of 1 |
| APPLICATION NO. | : 13/660715 | |
| DATED | : August 4, 2015 | |
| INVENTOR(S) | : Johnson et al. | |

It is certified that error appears in the above-identified patent and that said Letters Patent is hereby corrected as shown below:

In the specification

Column 4, line 11, delete "subsystem" and insert --system--, therefor

Column 4, line 45, delete "/D" and insert --A/D--, therefor

Column 5, line 57, delete "subsystem" and insert --system--, therefor

Column 6, line 29, delete "batFtery" and insert --battery--, therefor

Column 6, line 35, delete "300." and insert --310.--, therefor

Column 8, line 34, delete "434" and insert --436--, therefor

Column 9, line 36, delete "500" and insert --510--, therefor

In the claims

Column 10, line 58, Claim 1, delete "therein:" and insert --therein;--, therefor Signed and Sealed this
Nineteenth Day of January, 2016

Michelle K. Lee
*Director of the United States Patent and Trademark Office*